United States Patent [19]
Funk et al.

[11] Patent Number: 6,148,239
[45] Date of Patent: Nov. 14, 2000

[54] PROCESS CONTROL SYSTEM USING FEED FORWARD CONTROL THREADS BASED ON MATERIAL GROUPS

[75] Inventors: Merritt L. Funk; Lori A. Peters, both of Austin, Tex.

[73] Assignee: Advanced Micro Devices, Inc., Sunnyvale, Calif.

[21] Appl. No.: 08/989,963

[22] Filed: Dec. 12, 1997

[51] Int. Cl.$^7$ .................................................. G05B 15/00
[52] U.S. Cl. ................................ 700/1; 700/10; 700/17; 700/29; 700/247; 395/500.39
[58] Field of Search ................................ 700/1, 83, 44, 700/29, 247, 10, 17; 430/5, 30; 34/62; 395/500.39

[56] References Cited

U.S. PATENT DOCUMENTS

| 5,631,825 | 5/1997 | Van Weele et al. ........................ 700/83 |
| 5,786,114 | 7/1998 | Hoshimoto ................................... 430/5 |

OTHER PUBLICATIONS

Boning et al., "Run by Run Control of Chemical–Mechanical Polishing" IEEE/CHMT International Electronics Manufacturing Technology Symposium, Austin, Texas Oct. 2–4, 1995.

E. Zafiriou et al., "Nonlinear Model Based Run–to–Run Control for Rapid Thermal Processing with Unmeasured Variable Estimation" 187th ECS Meeting, Reno, NV, May 1995.

Sachs et al., "Process Control System for VLSI Fabrication" submitted to IEEE Transactions on Semiconductor Manufacturing, Apr. 15, 1990, pp. 1–31.

Hankinson et al., "Integrated Real–Time and Run–to–Run Control of Etch Depth in Reactive Ion Etching", Department of Electrical Engineering and Computer Science, University of Michigan, Ann Arbor, Michigan 48109–2122, Mar. 13, 1996, pp. 1–17.

Smith et al., "Compensating for CMP Pad Wear Using Run by Run Feedback Control", VMIC, Santa Clara, CA, Jun. 18–20, 1996.

Boning et al., "Practical Issues in Run by Run Process Control", 1995 IEEE/SEMI Advanced Semiconductor Manufacturing Conference, pp. 201–208.

*Primary Examiner*—William Grant
*Assistant Examiner*—McDieunel Marc
*Attorney, Agent, or Firm*—Skjerven, Morrill, MacPherson, Franklin & Friel, LLP; Ken J. Koestner

[57] ABSTRACT

A process control system using feed forward control threads based on material groups performs material tracking to account and adjust for variability of processing in a process flow that includes multiple machines, machine configurations, and machine setups. The process control system using feed forward control threads based on material groups distinguishes variations in processing parameters and characteristics for processed material samples and modifies processing at subsequent steps in response to the variations. The process control system using feed forward control threads based on material groups controls materials groups so that material samples with a like processing history are processed with a similar machine configuration or setup for subsequent processing steps. The tagging of material groups permits management of material having different process characteristics in a process flow to improve the efficiency of material scheduling by supplying information to assist sorting of materials based on a manufacturing signature.

24 Claims, 5 Drawing Sheets

Entity: A

| Lot | Child | TW | Process Entity | Product | Group Stp.Exp.RV.S,E | Etch Time | Age Days | Etch FICD | Si | Age FICD | Org |
|---|---|---|---|---|---|---|---|---|---|---|---|
| EWMA > | | | | | 61.73.B1.0,2 | 27 | 1.57 | 0.92 | Targ: | 0.90 | |
| Lot 5 | | P | A | M1 | 61.73.B1.0,2 | 27 | 1.57 | 0.91 | 18 | 0.71 | APC |
| Lot 4 | | P | A | M1 | 61.73.B1.0,2 | 23 | 2.13 | 0.93 | 18 | 1.86 | APC |
| Lot 3 | | P | A | M1 | 61.73.B1.0,2 | 27 | 2.28 | 0.93 | 17 | 1.87 | APC |
| Lot 2 | | P | A | M1 | 61.73.B1.0,2 | 27 | 2.36 | 0.86 | 18 | 1.93 | APC |
| Lot 1 | | P | A | M1 | 61.73.B1.0,2 | 27 | 2.43 | 0.90 | 18 | 1.82 | APC |
| Lot 1A | Lot 1A | C | A | M1 | 61.73.B1.0,2 | 30 | 2.58 | 0.91 | 18 | 1.89 | RMS |
| EWMA > | | | | | 62.68.B1.5,2 | 35 | 1.57 | 0.94 | Targ: | 0.90 | |
| Lot 11 | | P | A | M1 | 62.68.B1.5,2 | 38 | 1.60 | | | | APC |
| Lot 10 | | P | A | M1 | 62.68.B1.5,2 | 35 | 1.98 | 0.95 | 18 | 1.71 | APC |
| Lot 9 | | P | A | M1 | 62.68.B1.5,2 | 35 | 2.34 | 0.92 | 17 | 1.87 | APC |
| Lot 8 | | P | A | M1 | 62.68.B1.5,2 | 31 | 2.45 | 0.95 | 18 | 2.13 | APC |
| Lot 7 | | P | A | M1 | 62.68.B1.5,2 | 31 | 2.56 | 0.88 | 18 | 2.32 | APC |
| Lot 7A | Lot 7A | C | A | M1 | 62.68.B1.5,2 | 30 | 2.80 | 0.91 | 18 | 2.53 | RMS |

Entity: B

| Lot | Child | TW | Process Entity | Product | Group Stp.Exp.RV.S,E | Etch Time | Age Days | Etch FICD | Si | Age FICD | Org |
|---|---|---|---|---|---|---|---|---|---|---|---|
| EWMA > | | | B | | 61.200.B4.0,3 | 26 | 1.57 | 0.96 | Targ: | 0.95 | |
| Lot 23 | | P | B | M2 | 61.200.B4.0,3 | 26 | 2.36 | | | | APC |
| Lot 22 | Lot 22A | P | B | M2 | 61.200.B4.0,3 | 26 | 2.43 | 0.96 | 18 | 1.82 | APC |
| Lot 22A | | C | B | M2 | 61.200.B4.0,3 | 30 | 2.58 | 0.94 | 18 | 1.89 | RMS |

FIG. 5

PROCESS CONTROL SYSTEM USING FEED FORWARD CONTROL THREADS BASED ON MATERIAL GROUPS

BACKGROUND OF THE INVENTION

1. Field of the Invention

The present invention relates to process control systems including computer-based materials management. More precisely, the present invention relates to a feed forward process control system used in semiconductor fabrication based on material groupings.

2. Description of the Related Art

A semiconductor fabrication plant for manufacturing high-performance circuits such as microprocessors must produce quality, uniform integrated circuits to tight specifications and tolerances. A typical process flow in a fabrication plant includes several processing stages utilizing multiple diverse processing machines. Generally, a manufacturing facility includes several processing machines for some or all processing stages. The processing machines for a particular stage may include multiple different types, versions, generations, and models and thus have very different performance characteristics and capabilities. The processing machines often have some differences in calibration, configuration, and setup characteristics that additionally vary performance. Furthermore, each processing machine inherently has some variability in performance over time due to natural aging or degradation of components and application of scheduled maintenance.

This diversity in processing equipment results in some variability in performance that leads, in turn, to variation in the fabricated circuits that affects the electrical characteristics of the manufactured circuits, the operating speed of the fabricated parts, and the relative incidence of rework that is necessary to produce circuits that conform to specifications.

A processing "recipe" is applied at each of the several processing stages and defines processing parameters such as processing durations, dosages, intensities, and the like to achieve predefined specifications. The processing recipe is determined generally on a theoretical and experiential basis. Unfortunately, each of the several processing stages is not independent of the other stages so that variability in one stage may affect the processing characteristics, and thus modify the optimum recipe, of a subsequent stage.

However, a conventional fabrication plant does not identify the processing history of a particular wafer nor distinguish among multiple wafers in storage. A conventional fabrication plant includes storage for storing or holding wafers in various stages of manufacture. The completed stages of processing for each wafer are identified and designated, for example, on a label affixed to the wafer or affixed to a container holding multiple wafers having the same stage of fabrication. For example, in a large-scale fabrication facility, a stack of wafers is held in a temporary storage designated for awaiting photolithography processing. The stack of wafers is exposed in lithography processing and transferred to a temporary storage designated for awaiting etch processing. Therefore, although the processing stage of a wafer is continually known, specific processing characteristics of a wafer identifying the processing machine utilized at a particular processing step and the settings and calibration of the processing machine during performance of the step is not utilized. Conventional process control systems for semiconductor processing lack a capability to distinguish variations in processing parameters and characteristics for processed material samples. Conventional process control systems for semiconductor processing also lack a capability to modify processing at subsequent steps in response to variations in processing parameters and characteristics.

What is needed is a process control system and operating method for monitoring, tracking, and adjusting to the manufacturing variability of processing among different processing machines, machine sequences, and machine setups. What is needed is a process control system and operating method that track specific process parameters and characteristics throughout the processing steps applied to a material sample.

SUMMARY OF THE INVENTION

A process control system using feed forward control threads based on material groups performs material tracking to account and adjust for variability of processing in a process flow that includes multiple machines, machine configurations, and machine setups. The process control system using feed forward control threads based on material groups distinguishes variations in processing parameters and characteristics for processed material samples and modifies processing at subsequent steps in response to the variations.

The process control system using feed forward control threads based on material groups controls materials groups so that material samples with a like processing history are processed with a similar machine configuration or setup for subsequent processing steps. The tagging of material groups permits management of material having different process characteristics in a process flow to improve the efficiency of material scheduling by supplying information to assist sorting of materials based on a manufacturing signature.

In accordance with an embodiment of the present invention, a process control system using feed forward control threads based on material groups configures or sets up one or more machines for processing material at a predetermined granularity of material tracking. The process control system performs a process including a plurality of process steps that are performed in a sequence. Entities are processing machines of various types that are activated to perform the process steps in the process flow. Materials are various manufactured products that are produced via the process flow. The process, entities and materials are affected by variables. Process variables relate to processing of a material such as input and output parameters. Examples of process variables include temperature, pressure, etch time, energy recipe parameters and characteristics, and chemical batch parameters. Entity variables relate to a machine state of the machines in the process. Examples of entity variables include lamp hours for a photolithography machine, the number of wafers processed since cleaning for regularly cleaned and regularly maintained machines such as an etch chamber, and idle time of a machine. Material variables are variables related to the particular material processed in the process flow and include product, technology, and reticle, for example.

The process control system utilizes process variables, entity variables, and material variables that are known to cause variability in subsequent processing. A set of rules is defined and selected for application to the utilized variables. The set of rules, which is applied in the form of a logic program, is applied to the variables to determine an identifying and descriptive "tag" that is associated with a material sample. The tag associates the tagged material with a "group" of similar material. At the occurrence of a processing step applied to the tagged material, the rules are applied to the variables of the material subsequent to the processing step and the variables previous to the processing step to generate an identifying tag for the material following the processing step. Tagging associates the material with a group having common characteristics and properties although crossing a number of process steps.

For subsequent processing steps of the tagged material, the tagging of the material is used to configure the setting of the entity of the process step, adjusting the entity to supply a first-order approximation of setup parameters that are expected to deliver consistent processing results.

Many advantages are achieved by the process control system using feed forward control threads based on material groups. The process control system and operating method advantageously update and store information relating to materials, machine entities processed by a material, and the process for tracking member material units of a material group and determining which material units are a member of a material group having a common manufacturing signature. The process control system advantageously supports automated dispatching of material. Automated dispatching of material assists in forming material groups having a common manufacturing signature. The process control system advantageously supports flexibility in associating particular rules to specific machine entities and specific material types. The concept of using feed forward control threads based on material groups in a process control system advantageously enables process feed forward control to areas of manufacturing that have heretofore not been subject to effective management.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
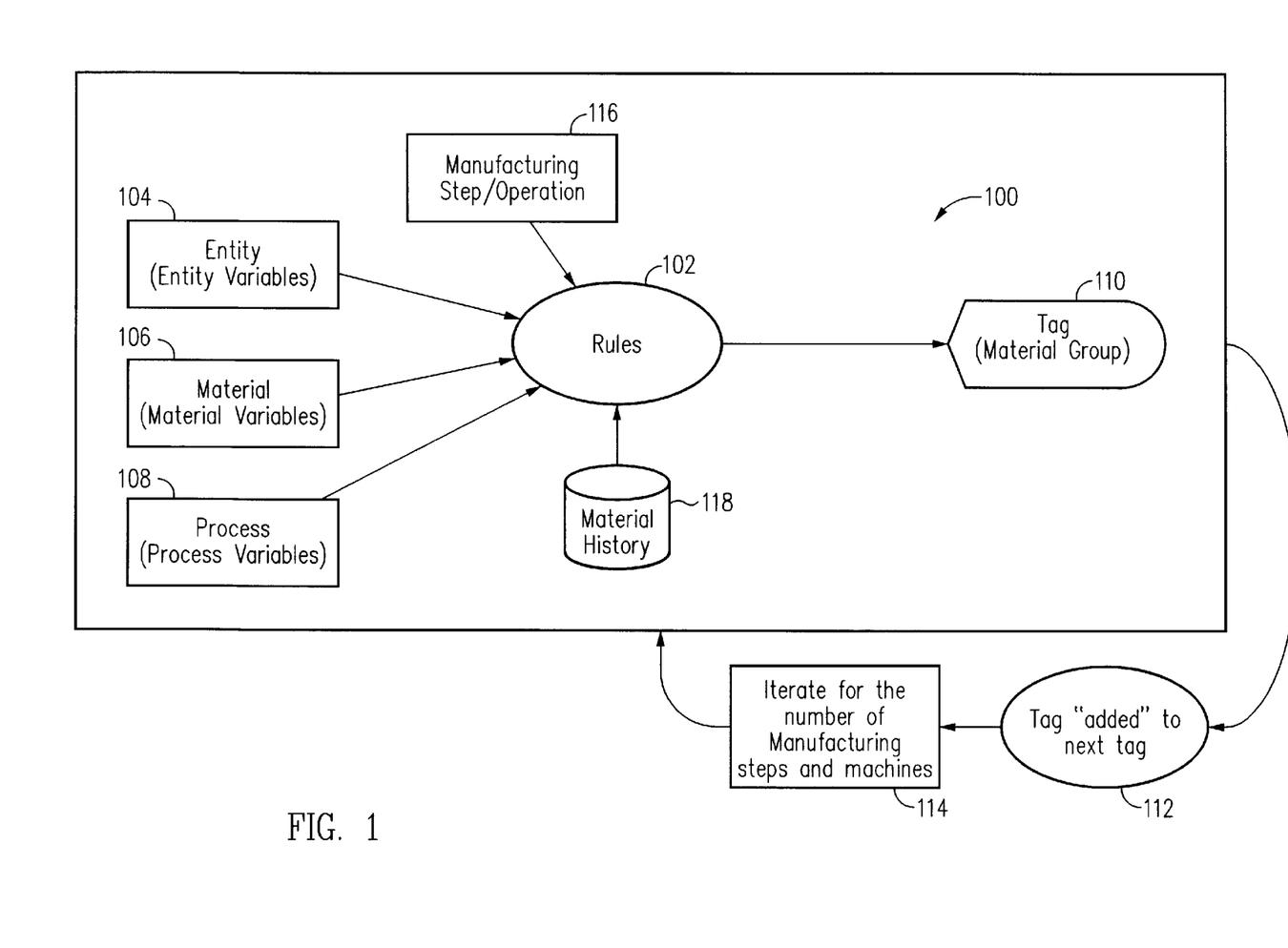
FIG. 1 is a schematic block diagram illustrating a process control system using feed forward control threads based on material groups.

Referring to FIG. 1, a schematic block diagram illustrates a process control system 100 using feed forward control threads based on material groups. The process control system 100 includes rules 102 that operate upon variables defining one or more entities 104, one or more materials 106, and one or more processes 108. The process control system 100 configures or sets up one or more entities 104, which are also called machines, for processing materials 106 at a predetermined granularity of material tracking. A process tool under control of the process control system 100 performs a process 108 including a plurality of process steps that are performed in a sequence. Entities 104 are processing machines of various types that are activated through the operation of the process control system 100 to perform the steps of the process 108 in the process flow. Materials 106 are various manufactured products that are produced via the process flow. The process 108, entities 104, and materials 106 are affected by variables. Process variables include input and output parameters that relate to processing of a material 106. Process variables include temperature, pressure, etch time, energy recipe parameters and characteristics, and chemical batch parameters. Entity variables define the machine state of the machines 104 in the process 108. Entity variables include lamp hours for a photolithography machine, the number of wafers processed since cleaning for regularly cleaned and regularly maintained machines such as an etch chamber, and idle time of a machine. A machine maintenance event such as the cleaning of a chamber, the changing of a lamp, a calibration operation, and the like is classified as a first-order effect which leads to the creation of a new material group. Material variables are variables related to the particular material processed in the process flow and include product, technology, and reticle selection. A reticle is an exposure mask that includes only a portion of a complete pattern of a die across a wafer. Material variables are variables within the process that are independent of the entities or processing tools or machines. Process variables include temperatures, etch times, recipes, chemical batches, and characteristics that are related to chemical processes. Temperatures and pressures are generally set by a process using a recipe that specifies temperature, pressure, and etch time.

The variables are ranked based on the effect of the variables upon the material and the system. Variables that greatly influence the material and system are ranked as first-order variables. Second-order variables have less effect on the material and system. Typically variables having an effect lower than second-order variables are ignored in some embodiments of the process control system.

The process control system 100 utilizes process variables, entity variables, and material variables that are known to cause variability in subsequent processing. A set of rules 102 that describe the modification of the utilized variables during a step of the process 108 is empirically determined. The set of rules 102 is applied in the form of a logic program to the variables to determine an identifying and descriptive "tag" 110 that is associated with a material sample. The set of rules 102 are defined as a set of characteristics that alter the process sufficiently to change parameters of the processed material beyond an allowed range. The rules define the differences in a processed product that are sufficient to be an initial point for creating a separate material group. The set of rules 102 describe all characteristics that could be sufficiently variable to create a "different" resultant material, a distinctive material group. Each of the defined characteristics in the set of rules 102 includes an associated tag which is allocated to the processed material. A rule specifies a tag that uniquely identifies all the characteristics that are important for tagging a material as a member or not a member of a group. A rule generally defines the difference in a variable that is sufficient to cause a measurement to change an amount such that the changed material institutes a new material group.

Particular rules are generally process and material dependent so that the sets of rules for two different processes are very different.

The tag 110 associates the tagged material with a "group" of similar material. Tagging 110 is useful for uniquely identifying a material group, recording a location for materials, and tracking sequencing of the process. Tagging 110 is generally applied to material groups, but may be applied for tracking individual semiconductor wafers. The tag 110 includes a plurality of variables or degrees of freedom that relate to a corresponding plurality of material characteristics. Alarm conditions or failure conditions are logged to denote that a machine entity encountered a failure condition during processing of a lot. Alarm conditions, failure conditions, and machine maintenance generally are events that cause the tagging 110 operation to create a new material group for separating the devices subject to change at subsequent processing steps.

At the occurrence of a processing step applied to the tagged material, the rules 102 are applied to the variables of the material 106 subsequent to the processing step and the variables previous to the processing step. A previous tag is added to a next tag 112 to generate an identifying tag for the material 106 following the processing step. Tagging 110 associates the material 106 with a group having common characteristics and properties although crossing a number of process steps.

In an illustrative embodiment of the process control system 100, tagging 110 is performed automatically through execution of a software computer program. In one example, the software program executes on a processor that controls a stepper of the photolithography unit. The software program controls the scanning action of the stepper and supplies information regarding the scan and the scanned material to a data server (not shown) and stored in a database. A material group then moves to a measurement station to perform a Develop Inspection Critical Dimensions (DICD) operation. Critical dimensions are measured for some of the wafers following the develop step of the photoresist processing procedure. Measurements performed during the Develop Inspection Critical Dimensions (DICD) step are typically inaccurate by nature relative to a Final Inspect Critical Dimension (FICD) measurement. DICD measurements are relatively noisy and often do not reflect important process variations in the photolithography process. For example, the Develop Inspection Critical Dimensions step may include measurement of critical dimensions for three "pilot" wafers in a lot of 24 wafers. In other embodiments of a fabrication process more or fewer wafers may be tested to characterize a full lot of wafers. A single wafer may be tested. The greater the number of tested "pilot" wafers, the better the characterization of the lot remainder. The DICD results are stored in the database, updating tag information for the material control threads. DICD values are typically used for gross filtering of incoming material, creating one or more new groups for differentiation at later processing steps.

The material groups then move to an etch chamber where the tagging 110 operation accesses the database to determine whether the material belongs to a material group, the characteristics of the group, and the FICDs of the group. If FICD values do not exist for the material group or if the values greatly differ from a range of expected values, then the tagging 110 operation creates a new material group describing the material and stores tags for the new group. The tagging 110 documents the relationship of group threads including parent/child relationships. The etch operation is then carried out and controlled using information read from the database to determine etch control variables such as etch time, chemical composition of the etchants, and time elapsed between exposure on the photolithography stepper since chemical processes have some time dependency.

The process control system 100 loops through a plurality of iterations 114 for a plurality of manufacturing steps/operations 116 to generate an updated material 106 and a plurality of machines or entities 104. In one example, the manufacturing step/operation 116 includes a step of depositing a polysilicon layer and an operation of locating a material for processing on the current entity. The Rules 102 use information from the manufacturing step/operation 116 to determine the rules to follow during processing of the Entity Variables 104, the Material Variables 106, and the Process Variables 108. The Rules 102 for the current Manufacturing Step/Operation 116 often utilize stored Material History 118 information. Examples of Material History information for Polysilicon include soft variables such as DICDs that are very high or very low or an Engineering experiment attached to material. Differences in as few as one variable may cause the Rules 102 to create a new Tag or Material Group 110.

For subsequent processing steps of the tagged material, the tagging 110 of the material 106 configures the setting of the entity 104 of the process 108 step, adjusting the entity 104 to supply a first-order approximation of setup parameters that are expected to deliver consistent processing results.

The process control system 100 is advantageously used to reduce the number of rework lots, reduce the standard deviation of material (such as FICDs), simply the operation of the process control system, and reduce the amount of engineering support of the system.

In some embodiments, a group is defined by a series equation, as follows:

$$G = \sum_{i=0}^{n} S_i \left[ \sum_{i=0}^{n} E_i \sum_{i=0}^{n} M_i \sum_{i=0}^{n} P_i \right].$$

A process control system 100 having three variables for each entity, material, and process, for example, has a series equation, as follows:

$$G1 = (S1(E1M1P1))(E2M1P2))(E3M1P2))).$$

In this example, a set of material 106 is processed on a given process entity 104 (Entity=E1) with a set of entity variables $E_1$(EV1, EV2, . . . , EVn), process variables $P_1$(PV1, PV2, . . . , PVn), and material variables $M_1$(MV1, MV2, . . . , MVn). The set of input variables, in combination with a history of previous material states is operated upon by a set of rules 102 that determines a "group" (G1) to associate with the material entity 104. When the material 106 is processed at a subsequent process step, the setting of the process entity 104 is adjusted to supply a first order approximation of expected setup parameters to deliver consistent processing results.

The illustrative process control system 100 is highly advantageous for managing the wide proliferation of material groups that are created in a typical fabrication line. For example, a typical process includes four steppers that run with four different reticles. Disregarding the possibility that the reticles are allowed to move between steppers, if the photoresist batch is changed, a minimum of eight groups are mixed in photolithography for fabricating one product. If three products are fabricated, 24 groups (G1 through G24) are created in the photolithography processing.

When the multiple lots created during photolithography processing move to an etch step which includes processing in up to six etch chambers, the number of groups is expanded to 144 (6*24).

If one of the chambers is cleaned in a common maintenance operation, the number of groups is increased to 168 (7*24). A mix of ERFs having an average of 2 ERFs running in the line increases the number of groups by two to 170 (7*24+2).

A lot cycle time of 50+ days from Etch to FWET, one exposure change for each stepper, and 5 chamber clean operations for each etcher, the number of groups to be managed increases to 720 (24*5*6).

In one example, a typical fabrication line includes two steppers, two products, and one ERF, resulting in a minimum of 21 groups running in Etch processing alone.

A process control system 100 evaluates a process performed by an entity on a set of material to determine a group to associate with the set of material. The unique group for including a set of material is described by a series equation as follows:

$$G=S1\{E0M0P0+E1M1P1+\ldots+EnMnPn\}+S2\{E0M0P0+E1M1P1+\ldots+EnMnPn\}+\ldots$$

The equation describing all material groups is, as follows:

$$G=S1\text{-}n\{E0\text{-}nM0\text{-}nP0\text{-}n+E1\text{-}nM0\text{-}nP0\text{-}n+\ldots$$

In this example, a set of material 106 is ready for processing at a manufacturing step 116. The material history 118, along with the current process 108 on a given entity 104 forms a new "group" 110 associated with the set of material by rules 102 governing each manufacturing step. The group continues to grow as a Tag is "added" to a Next Tag 112 for each subsequent processing steps and for additional machines within a manufacturing step 114.

A starting set of material 106 at an initial step S1 is processed according to a Process 108 applied to the first entity 104 to create a Tag 110 that is defined by an equation, G1=S1{E0M0P0}. After the material is processed on the next entity, the group is then defined by an equation G2=S1{E0M0P0+E1M1P1}.

A Tag 110 of a material group for a processing Step 108 (S1) of several possible processing steps such as a local interconnect formation step, a polysilicon layer formation step, a metal layer 1 formation step, a contact formation step, a metal layer 2 formation step, and the like. For example a step S1 may be tagged with a value "R30" to designate a polysilicon layer formation step.

Each processing step has one or more operations performed on the material and performed by a number of entities. In one example, the first entity E0 is a process entity having a set of variables with values defined at an instant in time such that E0=(Entity+Ev1+Ev2+ . . . ). More specifically, the first entity E0 has an entity name designated as STP12 and identifying a particular stepper, and a variable designated as a PM counter set to a value 2. The processed material M0 has values defined at an instant in time so that M0=(Material+Mv1+Mv2+ . . . ). More specifically, the material M0 is a material product 6060 and has a variable reticle 30B1. The process P0 is the process performed by the entity E0 on the material M0 with a defined set of process variables, P0=(Process+Pv1+Pv2+ . . . ). More specifically, the process P0 is a process type of DPUV with an energy of 6.8 mJ. The Tag generated in this example may have the form, G1=(R30, 6060, 1268B12).

As the process flows through several steps, the steps, entities, materials, and processes are described and tagged as follows:

Example Lot A:
Step 1 Photolithography:

S0=R30 (Poly)

E0=STP62, 2 pm count (+variables: BP, focus, lamp hours)

M0=6060 Ret B1

P0=6.8 mJ (+variables: 0.340 DICD, idle time, lot count . . . )

Tag=G1=R30, 6060, 6268R12

Step 2 Etch:

S1=R30 (Poly)

E1=ET60HA, 3 pm count (+soft parms: 47 Deg, idle time, BP, wafer count . . . )

M1=6060

P1=31s etch time (+variables: 153 total etch time, . . . )

Tag=G1'=R30, 6060, 6268R12, ET60CHA, 3

Step 3 FICD:

S1=R30 (Poly)

E2=CD22 (+variables: last pm, . . . )

M1=6060

P1=0.320 FICD

Tag=G1"=R30, 6060, 6268R12, ET60CHA, 3, CD22

Figure 2:
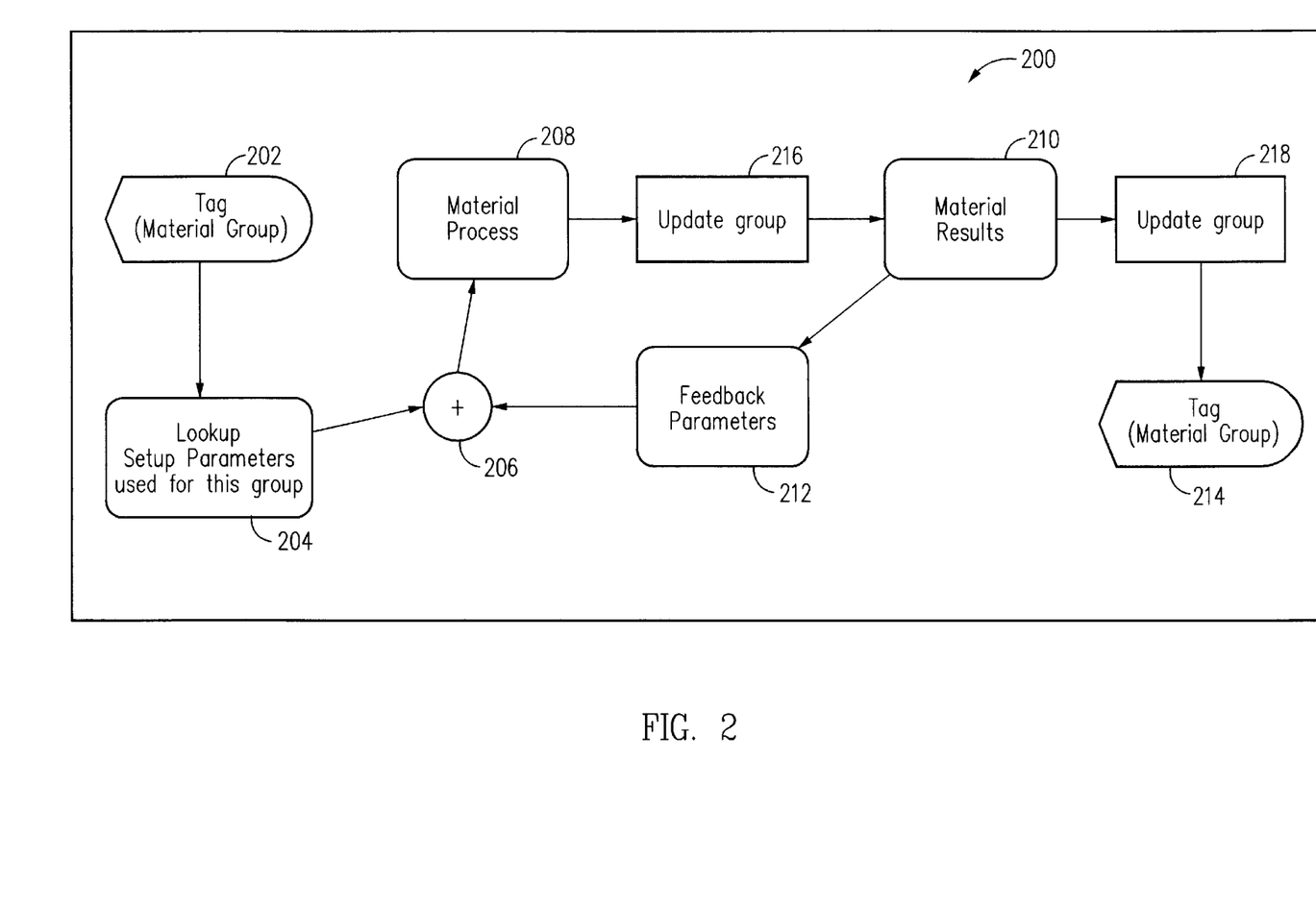
FIG. 2 is a flow diagram illustrating a process flow for processing a set of material on a single process entity and measurement tool.

Referring to FIG. 2, a flow diagram illustrates a process flow 200 for processing a set of material 106 on a single process entity 104. The process flow 200 represents manufacturing operations such as a polysilicon etch operation. Material is processed based on information feed forwards from a photolithography step. During processing at each process step a material group is updated into a material process update group 216 using the same process that is fed forward to a next step. An updated tag from the material process update group 216 tagging is fed forward to future manufacturing steps. Feedback parameters 212 include information such as a designation of whether the material is a "child" of a parent material group. The feedback parameters 212 also include statically-filtered information such as FICD for the material, the number of sample points used for FICD calculations, the statically-computed FICD value for the group. Setup Parameters 204 include Temperature, Energy, Focus, Etch Target, Equations variables, and the like.

The process flow 200 for a material group begins in a Tag Material Group step 202 by identifying the material group to be operated upon using the descriptive "tag" that is associated with a material sample. Using the descriptive tag to identify lookup setup parameters for the identified material group, lookup setup parameters for the group are accessed in a Get Group Setup Parameters step 204. The group setup parameters include, for example, temperature, entropy, focus, etch target, equations, equation variables, and the like. The group setup parameters for the group are updated with feedforward parameters at an accumulator 206. The updated group setup parameters are applied to a Material Process step 208 in which entity variables, material variables, and process variables that are set by the lookup setup and feedforward are implemented in a process step. Accordingly, the entity variables are applied to a machine entity to control operation of the machine. Process variables are applied to control process parameters, such as temperature and pressure, of the process step. Material variables are applied to determined modifications of the material that are to be attained through operation of the process step. Material characteristics are measured following the process step in a Material Results step 210 to supply processed material characteristics. Also in the Material Results step 210, characteristics of the entities, process are measured. The material characteristics, entity characteristics, process characteristics are updated and recorded in a Feed Forward Parameters step 212 and fed to the accumulator 206 to operate the process control system using feed forward control threads based on material group.

Figure 3:
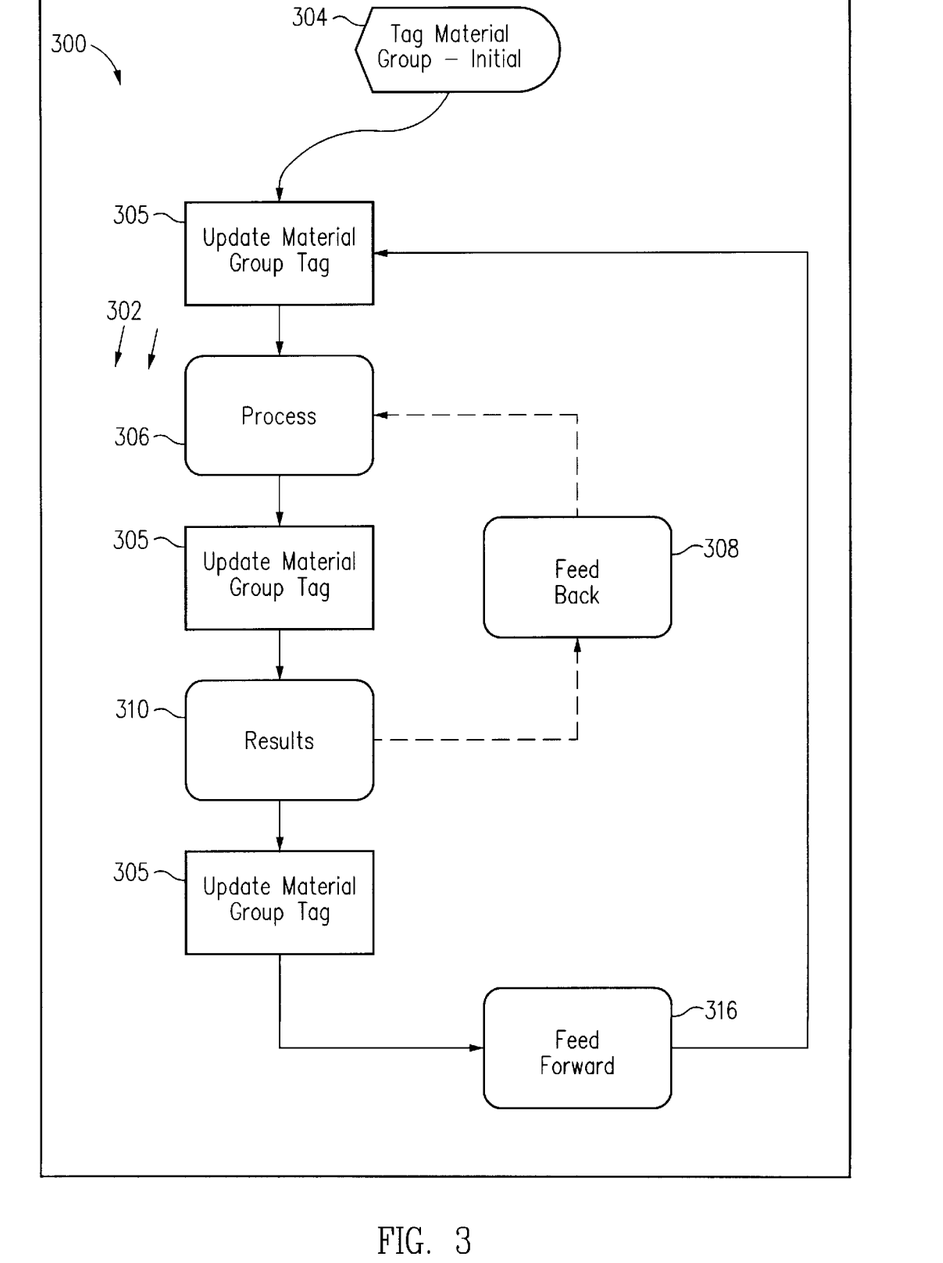
FIG. 3 is a flow chart illustrating an example of the operation of the process control system using feed forward control threads based on material groups.

Referring to FIG. 3, a flow chart illustrates an embodiment of the operation of the process control system 300 using feed forward control threads based on material groups. The process control system 300 employs the concept of control threads for tracking materials in one or more material groups. A control thread is a single process for processing a material unit in a material group. The start of a control thread is the root from which independent dynamic process control action occurs within the process control system. The process control system typically has a plurality of simultaneous control threads, some of which may be created, then subsequently terminated. A plurality of materials are processed in the process control system 300 generally using multiple control threads. In an illustrative embodiment, the process control system 300 is a combination of multiple software applications and one or more databases for tracking material thread information and determining the position of a material in the process control flow. A control thread 302 is created at the point a material enters the process flow and grows as the material progresses through a fabrication line. In an initial tag material group step 304 the process control system generates a tag that is applied to a material unit. The tag identifies a material unit and designates material variables pertinent to processing of the material. Tags are updated subsequent to initialization in an update tag step 305.

In an illustrative embodiment, a simple process flow includes only two machine entities, a photolithography unit for performing a photolithography step 306 and an etcher, such as a plasma etch chamber, for performing an etch step 308. The simple process flow is utilized to simply illustrate the operation of the process control system 300. A more complex process flow may be formed by adding further machine entities to the process and by performing multiple loops of the processing steps. For example, a single iteration or a plurality of iterations may be interposed between the photolithography step 306 and the etch step 308. In particular, a single etched layer or several (20 or more) etched layers may be formed on the surface of a semiconductor wafer. Furthermore, the photolithography step 306 and the etch step 308 may each be performed using a single machine entity having a single setting or may be performed using multiple machine entities or process tools having multiple settings.

The photolithography step 306 and the etch step 308 are material process steps that modify the process material. The state or characteristics of the material are updated following the material process steps in material result steps including a step for measuring process results following photolithography 310 and a step for measuring the state or characteristics following etching 312. For example the photolithography material result step 310 typically including determination and recording of the time and intensity a material is exposed, a stepper identifier, the focus energy, exposure duration, photoresist batch changes, and reticle selection. The etching material result step 312 includes measurement and recording of the time of etching, etch duration and etchant composition. The photolithography material result step 310 also records information relating to maintenance, such as preventative maintenance, of the photolithography machine. For example, denoting a lamp change that causes an exposure dose to differ for the same settings or that the focus may differ between different photolithography tools. Differences in machine entity may be sufficiently severe that the system may recognize a different thread of material generated by the photolithography step 306 and input to the etch step 308. A preventative maintenance (PM) event may be sufficient to generate a new thread that creates a new material group.

In various embodiments of the process control system 300, a particular variable may be sufficiently influential to create a new group. In other embodiments, the particular variable may be only minimally influential in altering performance of a material. For example, barometric pressure typically effects material characteristics only a small amount.

The FICD measurements may be tuned finely or coarsely for designating a new material group.

The updated parameters and information are fed forward 316 based on the characteristics of the processed material. The feed forward operation 316 is highly advantageous for automating the material tracking operations of the process control system 300. Manual tracking of the multiple possible variables in the process control system 300 is prohibitive due to the possibility of multiple possible machine entity and multiple machine entity operating configurations. The feed forward operation 316 automates the process control system 300 and allows modification of the etch process to adjust to variations in the results of the photolithography process. For example, the process control system 300 feeds forward information measured in the photolithography material result step 310 and sets the recipe of the etcher to etch the photoresist a longer time or a shorter time, depending on what action is suitable to control the FICD value. Accordingly, all material groups processed in the etch step 308 advantageously are processed to generate a tightly-controlled FICD distribution.

Information is fed forward from the feed forward operation 316 to the update tag operation 305 to resume processing of some threads and create new group threads in other cases.

Usage of the feed forward operation 316 advantageously supports prediction of future characteristics of the processed materials to modify process controls and adjust to material characteristics. The feed forward operation 316 advantageously controls operations not only of operations directly preceding a measurement but also extends to process operations far in advance of a process step and measurement. For example, if FICD results were found to be highly dependent on polysilicon deposition thickness, the process may be adjusted back to a diffusion process step and controlled by determining which furnace produced the wafers, generating a new thread based on the selected furnace.

A conventional fabrication facility simply stacks materials from one step in a process flow and applies the materials randomly to subsequent process steps and processing tools without regard to previous processing characteristics and limitations so that variations in the fabrication process are not tracked. Material groups are not set apart or defined.

In an illustrative embodiment, the etching material result step 312 includes a step of determining Final Inspection Critical Dimensions (FICD) 314 and a resulting FICD parameter is fed forward 316 for further processing. In various process runs, the process flow may be simple or highly complex. The process control system 300 using feed forward control threads based on material groups records and updates information relating to material variables, machine entity variables, and process variables to precisely describe the processing applied to a material. Most simply stated, the process flow through the photolithography step 306 and the etch step 308 involves exposing a material and etching the material with a single measure, FICD, determining the result of a combined pattern and etch operation. Any of the operations may be simple or highly complex. A complex process may include photolithographic processing with several steppers, the steppers having variable alignments, exposure energies, photoresist batch characteristics, and performance from track to track. The processed material may have a plurality of input variables relating to the manner a material is exposed or the stepper operated. The material may be etched in multiple etching chambers using different etch processes such as wet etch operations and plasma etch operations using a variety of etching chemistries. The multiple chambers may further have different performance characteristics. FICD measurements are highly useful for determining characteristics and performance of the process that are substantially relevant to the performance characteristics, such as electrical characteristics and operating speed, of the ultimate fabricated parts.

In one embodiment, the feed forward operation 316 includes an analysis of the FICD to determine the control adjustments forwarded in the process. The result steps maintain a running count of the measured FICD values for each material thread. A particular thread passing through the photolithography step 306 to an etch chamber operating at a predefined photoresist etch time tracks a particular critical dimension. Following the etch step 308, the critical dimensions are measured. If the critical dimensions are greater than a predetermined limit amount, the feed forward operation 316 adjusts the photoresist etch time for the etch chamber.

In one embodiment that illustrates the highly dynamic nature of the process control system, a single material thread passes from a single photolithography unit to six different etch chambers, splitting the single thread into six different threads respectively allocated to the six etch chambers. The etching material result step 312 generates six sets of FICD measurements for the respective six threads. The feed forward operation 316 selectively controls the photoresist etch time for the six etch chambers individually. The individual etch chambers may have different bias from measured FICDs to electrical measurements so that different target FICD values are warranted for each etch chamber. Further emphasizing the dynamic nature of the process control system, a system may include six etch chambers that, following preventative maintenance, generate six different processing paths but only a single thread, since all etch chambers perform identically. Over time, the performance and characteristics of the etch chambers diverge. The divergence is detected in differing FICD measurements and the feed forward operation 316 responds by generating tags separating the process flow into a plurality of threads.

FICD measurements are relevant for analyzing two aspects of feature sizes are controlled in a lithographic and etch process. The first aspect is a critical dimension, the absolute size of a feature, including linewidth, spacing or contact dimensions. The second aspect is the variation in feature size across the wafer surface as measured by steps of a wafer stepper. Linewidth and spacing measurements are regularly performed to determine the actual sizes of critical dimensions at each masking level of a process.

An aspect of linewidth control is that correct feature sizes are to be maintained across an entire wafer and also maintained from wafer to wafer. As a feature size is reduced, the tolerable error on feature size control is also reduced. When an exposure is performed by a wafer stepper, the feature size is controlled across every exposure field and field-to-field variations are to be held within specified limits. Linewidth control is affected by many factors including fabrication tools and equipment, process recipes, and raw materials. Critical dimensions are analyzed by measuring fabricated test structures with nominal feature sizes at many positions of a wafer. The measurement results are then plotted as a function of location to determine critical dimension variation.

Linewidth control and control of critical dimensions are largely determined by specific characteristics of the steps of photoresist processing. Photoresist processing typically includes steps of substrate cleaning, dehydration baking and priming, spin coating, soft-baking or pre-baking, exposure, post-exposure treatment, a photoresist develop step, inspection following development, plasma de-scumming, post-baking, etching, deep ultraviolet hardening of photoresist, and stripping of the photoresist. Many of these steps are very important for determining linewidth control and control of critical dimensions. For example, dehydration baking and priming assures adhesion of the photoresist during processing. Poor adhesion can cause a loss of linewidth control including the entire loss of pattern elements in extreme cases.

The coating process including resist formulation, spinner type, wafer size, spin parameters, and ambient temperature during deposition determine the thickness variation across a wafer which, in turn, influences the critical dimensions across the wafer. Contamination with airborne particles and air bubbles can occur during the coating step. The soft-baking step can lead to wafer-to-wafer variations in critical dimensions since, for example, solvent vapors can coat infrared soft-baking lamps changing the energy output.

Exposure of the photoresist is an important step in the resist processing procedure for several reasons. First, exposure is a step in which wafers are processed individually, leading to possible wafer-to-wafer variations in exposure. Second, the results of the exposure are highly dependent on photoresist thickness so that differences in coating thickness arising in the photoresist coating step are amplified during exposure.

Critical dimensions are conventionally tested by randomly sampling one wafer or a few wafers of a lot or multiple lots of processed wafers on post-develop inspection. If a sampled wafer is found to have critical dimensions that are outside specifications, another sample from the lots of processed wafers may be tested. If the subsequent test results in critical dimensions outside specified values, many wafers may be remeasured. If the critical dimensions are consistently outside the specification limits, the lot or entire group of lots are stripped of photoresist and reprocessed through the photolithography process.

The critical dimensions of polysilicon gates affect many operating parameters of integrated circuits, but fundamentally the greatest considerations of critical dimensions is speed performance and power consumption of a circuit. The smaller this critical dimension, the faster the operation of the transistor and the integrated circuit as a whole. Too small a polysilicon gate critical dimension, however, results in unacceptably high power consumption and parasitic currents in the transistor. An optimal operating point for this critical dimension is therefore defined by these countervailing effects. Thus, the narrower the distribution of critical dimension values centered about the optimal critical dimension in a lot of wafers, the more high speed, functional circuits are produced. Unfortunately, the critical dimensions resulting from conventional manufacturing methods are rarely optimum, resulting in reduced yield of high performance circuits. Furthermore, the conventional process is very wasteful when process conditions are substandard.

Figure 4:
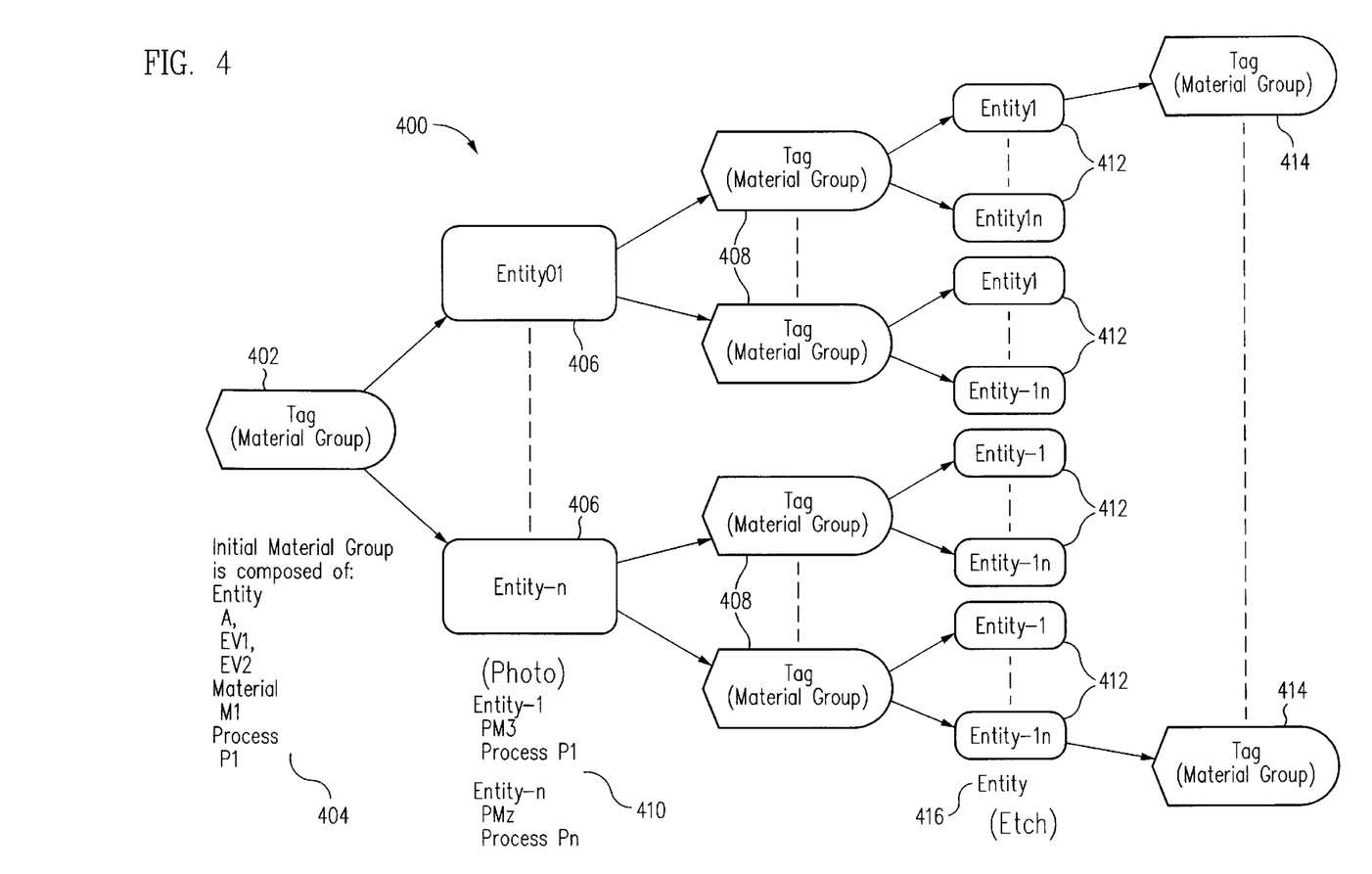
FIG. 4 is a process flow diagram showing a material group view from photolithography processing to etch processing.

Referring to FIG. 4, a process flow diagram shows a material group view from photolithography processing to etch processing. The process control system supports lot-to-lot critical dimension (CD) control by tracking lots having the same process characteristics between photolithographic processing and etch processing. When processing variables change in either the photolithography processing or the etch processing, the changes are to be detected by an etch CD controller or an Etch WFT/Engineer.

Groups 402 start at a first process tool that generates a part in a later process. The group 402 is selected from a stepper/track, processing energy, chemical batch, or call for preventative maintenance (PM). For polysilicon critical dimensions control, the choice of a stepper and track are assumed to be the first important variable. The process flow continues with a selection between produces 404, here a reticle. The selection of an entity 406, here an etch chamber, is the next material consideration, followed by operations 408 performed in the particular etch chamber entities 406.

Figure 5:
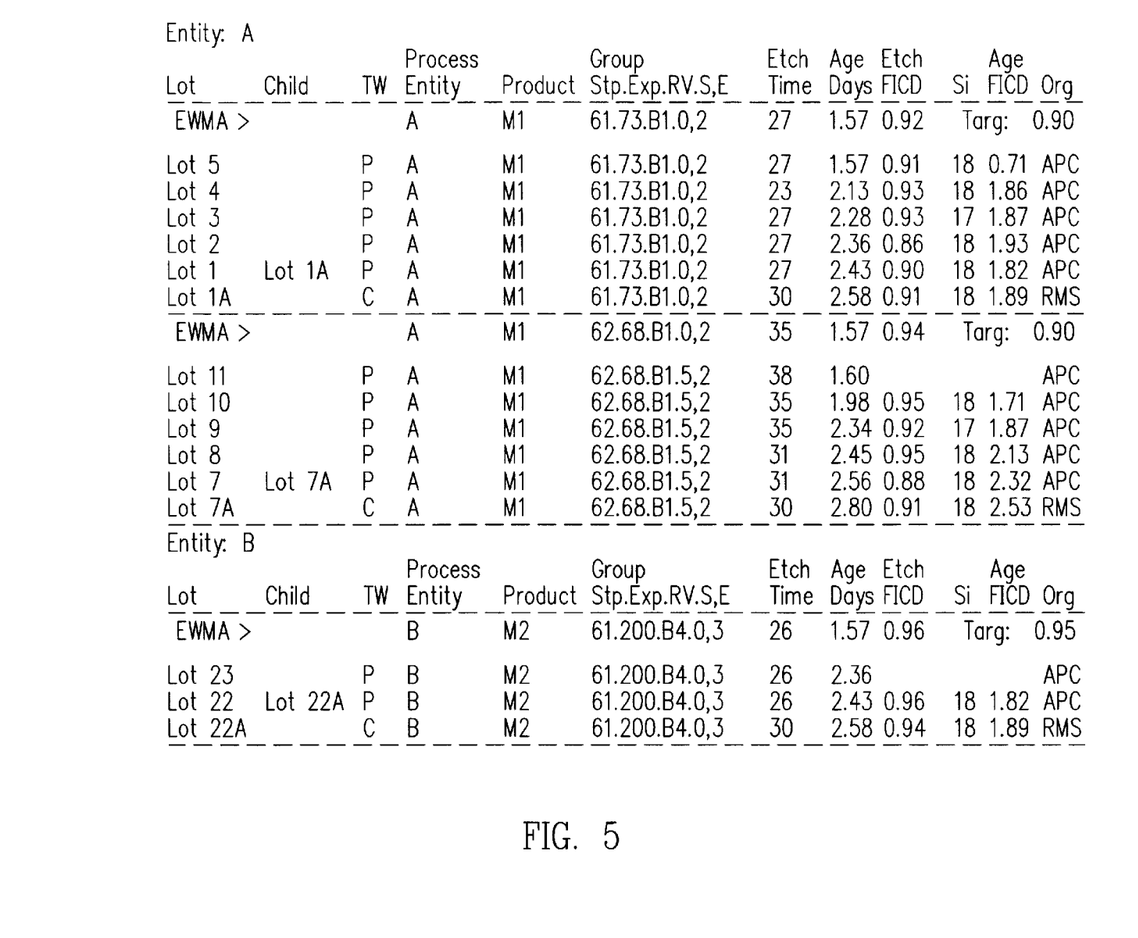
FIG. 5 is a table illustrating a parent/child view of material in an etch process.

Referring to FIG. 5, a table illustrating a parent/child view of material is shown at an etch process. A legend for the table is, as follows:

TW=Child or Parent
Group: Stp.=Stepper, Exp.=Exposure, RV=Reticle Version,
S=Stepper PM Counter, E=Etcher PM Counter
Si=Valid Sites
Org: FIX=RMS fixed value, RMS=first lot of an APC thread,
APC=Variable Time, PAM=User Override.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A method of tracking materials in a process control system comprising:
   selecting a plurality of process control variables that are known to cause a variability in results of processing;
   associating the plurality of process control variables with the processing of a material sample;
   processing the material sample;
   applying a set of rules to update the plurality of process control variables, the rules being defined by the material sample processing, the rules determining a tag identifying the processed material sample;
   updating process control variables for subsequent processing operations based on results of completed processing operations to predict future characteristics of processed material samples, modify process controls, and adjust material characteristics in a feed-forward control operation; and
   repeating the processing and applying operations for a plurality of processing operations.

2. A method according to claim 1 further wherein:
   the plurality of process control variables include entity variables relating to a machine state of a process tool.

3. A method according to claim 1 further wherein:
   the plurality of process control variables include material variables relating to the processed material.

4. A method according to claim 1 further wherein:
   the plurality of process control variables include process variables relating to the processing characteristics for processing the material.

5. A method according to claim 1 further wherein:
   the tag is an identification associating a material to a material group.

6. A method according to claim 1 further wherein:
   a material sample is processed on a process entity having an associated set of entity variables, process variables, and material variables.

7. A method according to claim 1, wherein:
   processing the material sample includes selectively processing the material sample using a plurality of process tools including:
   a plurality of photolithographic units; and
   a plurality of etch chambers, the photolithographic units and the etch chambers having different characteristics so that separate material groups are generated for process flow threads that pass through different photographic units and different etch chambers.

8. A process control system comprising:
   a plurality of process tool entities for processing the material sample;
   a database coupled to the plurality of process tool entities;
   a processor coupled to the plurality of process tool entities and coupled to the database; and
   a software system including an executable program code for executing a software program performing the method according to claim 1.

9. A computer program product comprising:
   a computer usable medium having computable readable code embodied therein including the software system according to claim 8.

10. A process control system comprising:
    a plurality of process tools linked in a process flow;
    a database coupled to the plurality of process tools;
    a processor operatively coupled to the plurality of process tools and to the database, the processor including a program storage;
    a software control program for loading into the program storage and executing the processor, the software control program including:
    a configuration routine defining a plurality of process control variables that are known to cause a variability in results of processing and associating the plurality of process control variables with processing of a material sample;
    a processing control routine controlling ones of the plurality of process tools during processing of the material sample;
    a feed-forward routine that updates process control variables for subsequent processing operations based on results of completed processing operations to predict future characteristics of processed material samples, modify process controls, and adjust material characteristics; and a tagging routine applying a set of rules to the plurality of process control variables, the rules being associated with the material sample processing, the rules determining a tag identifying the processed material sample.

11. A process control system according to claim 10, wherein:

the plurality of process tools includes:
a photolithographic unit.

12. A process control system according to claim 10, wherein:

the plurality of process tools includes:
a photolithographic stepper.

13. A process control system according to claim 10, wherein:

the plurality of process tools includes:
an etch chamber.

14. A process control system according to claim 10, wherein:

the plurality of process tools includes:
a plurality of photolithographic units; and
a plurality of etch chambers, the photolithographic units and the etch chambers having different characteristics so that separate material groups are generated for process flow threads that pass through different photographic units and different etch chambers.

15. A process control system according to claim 10, wherein:

the software control program further includes:
a looping program repeating the processing and applying operations for a plurality of processing operations.

16. A computer program product comprising:

a computer usable medium having computable readable code embodied therein including the software control program according to claim 10.

17. A process control system comprising:

a tag process that issues an identification associating a material to a material group;

a lookup setup parameters process coupled to the tag process, the lookup setup parameters process that determines setup parameters for the material group;

an accumulator coupled to the lookup setup parameters process, the accumulator that updates parameters of the material group and generates an additional material group when the updated parameters are substantially changed;

a material process coupled to the accumulator, the material process that processes the material according to the updated parameters;

a material results process coupled to the material process, the material results process that measures changes in the material resulting from application of the material process; and a feed-forward process that updates the parameters for subsequent material process operations based on material results of completed process operations to predict future characteristics of processed material samples, modify process controls, and adjust material characteristics.

18. A process control system according to claim 17, wherein:

the material process further includes:
a plurality of process tool entities for processing the material sample.

19. A process control system according to claim 17, wherein:

the material process is a plurality of process tools including:
a plurality of photolithographic units; and
a plurality of etch chambers, the photolithographic units and the etch chambers having different characteristics so that separate material groups are generated for process flow threads that pass through different photographic units and different etch chambers.

20. A process control system according to claim 17, further comprising:

a plurality of process tools;

a database coupled to the plurality of process tools;

a processor operatively coupled to the plurality of process tools and to the database, the processor including a program storage;

a software control program for loading into the program storage and executing one the processor, the software control program including:
the tag process;
the lookup setup parameters process;
the material results process;
the feedback parameters process; and
the accumulator.

21. A process control system according to claim 20, wherein:

the software control program further includes:
a looping program repeating the processing and applying operations for a plurality of processing operations.

22. A computer program product comprising:

a computer usable medium having computable readable code embodied therein including the software control program according to claim 20.

23. A process control system comprising:

a plurality of feed-forward control threads that account and adjust for variability of processing in a process flow including a plurality of machines, machine configurations, and machine setups;

a routine that initializes processing parameters of the plurality of feed-forward control threads for a specified material group;

a routine that determines results of processing of a step in the process flow;

a routine that updates processing parameters for subsequent steps in the process flow based on the results; and a routine that feeds the updated processing parameters forward to the plurality of machines, machine configurations, and machine setups for usage in the subsequent steps in the process flow.

24. A process control system comprising:

a plurality of feed-forward control threads that account and adjust for variability of processing in a process flow including a plurality of machines, machine configurations, and machine setups;

a routine that initializes processing parameters of the plurality of feed-forward control threads for the material groups;

a routine that tags the material groups;

a routine that determines results of processing of a step in the process flow;

a routine that updates processing parameters for subsequent steps in the process flow based on the results to manage materials having different process characteristics in the process flow by supplying information to assist sorting of materials based on a manufacturing signature; and a routine that feeds the updated processing parameters forward to the plurality of machines, machine configurations, and machine setups for usage in the subsequent steps in the process flow.

* * * * *